United States Patent
Hofmann et al.

(10) Patent No.: US 12,247,676 B2
(45) Date of Patent: Mar. 11, 2025

(54) USE OF A BALL SCREW, AND ACTUATING DRIVE ASSEMBLY

(71) Applicant: AUMA Riester GmbH & Co. KG, Müllheim (DE)

(72) Inventors: Benjamin Hofmann, Heitersheim (DE); Holger Graf, Freital (DE)

(73) Assignee: AUMA Riester GmbH & Co. KG, Müllheim (DE)

( * ) Notice: Subject to any disclaimer, the term of this patent is extended or adjusted under 35 U.S.C. 154(b) by 65 days.

(21) Appl. No.: 17/927,032

(22) PCT Filed: May 20, 2021

(86) PCT No.: PCT/EP2021/063532
§ 371 (c)(1),
(2) Date: Nov. 22, 2022

(87) PCT Pub. No.: WO2021/234116
PCT Pub. Date: Nov. 25, 2021

(65) Prior Publication Data
US 2023/0204125 A1    Jun. 29, 2023

(30) Foreign Application Priority Data

May 22, 2020   (DE) .......................... 102020113849.0
Jul. 29, 2020   (DE) .......................... 102020120064.1

(51) Int. Cl.
*F16K 31/50*    (2006.01)
*F16K 31/04*    (2006.01)

(52) U.S. Cl.
CPC .......... *F16K 31/508* (2013.01); *F16K 31/047* (2013.01)

(58) Field of Classification Search
CPC ............................. F16K 31/508; F16K 31/047
See application file for complete search history.

(56) References Cited

U.S. PATENT DOCUMENTS 5,195,721 A * 3/1993 Akkerman .......... F16D 43/2024
192/81 C
6,097,123 A * 8/2000 Weiss ..................... H02K 7/116
251/71

(Continued)

FOREIGN PATENT DOCUMENTS

DE          20008415          9/2001
DE        102009010871        9/2010

(Continued)

*Primary Examiner* — Patrick C Williams
(74) *Attorney, Agent, or Firm* — Volpe Koenig

(57) ABSTRACT

An actuating drive (2) including a ball screw drive (3) for activating a self-closing, linearly activated fitting (4) and a method of use are provided. While the opening of the fitting (4) with the actuating drive (2) takes place by an electric motor by the ball screw drive (3), a restoring movement is transmitted to the spindle (6) when closing the automatically closing fitting (4). The restoring movement, and thus also a closing movement of the fitting (4), can be at least indirectly decelerated by way of the ball screw drive (3), this being able to protect the fitting (4) and ultimately also the ball screw drive (3) and optionally further components connected to the fitting (4) and/or the ball screw drive (3) from damage, and facilitating a fail-safe function.

18 Claims, 3 Drawing Sheets

(56) References Cited

U.S. PATENT DOCUMENTS

| | | | |
|---|---|---|---|
| 6,488,260 B1 * | 12/2002 | Dietz | F16K 31/047 464/30 |
| 10,060,548 B1 | 8/2018 | Oak | |
| 2005/0045839 A1 * | 3/2005 | Kajitani | F16K 51/02 251/14 |
| 2016/0265676 A1 * | 9/2016 | Stumpp | F16K 31/047 |
| 2018/0058602 A1 | 3/2018 | Yates et al. | |
| 2018/0245711 A1 | 8/2018 | Oak | |
| 2019/0376610 A1 | 12/2019 | McElroy et al. | |

FOREIGN PATENT DOCUMENTS

| | | |
|---|---|---|
| DE | 102011103135 | 11/2012 |
| EP | 2228573 | 9/2010 |
| GB | 2266942 | 11/1993 |

\* cited by examiner

USE OF A BALL SCREW, AND ACTUATING DRIVE ASSEMBLY

TECHNICAL FIELD

The invention relates to the use of a ball screw drive for activating a self-closing, linearly activated fitting, and to an actuating drive assembly which comprises an actuating drive, a ball screw drive which is driven by the actuating drive, and a linearly activated fitting.

BACKGROUND

Fittings of this type are used in oil and gas production facilities, for example. It is known for fittings to be used here which are configured so as to be self-closing by a compressive load, on the one hand, and are equipped with a fail-safe function, on the other hand, the latter also permitting the fitting to be closed in a non-pressurized state, for example in the case of a malfunction.

Known from US 2018/058602 A1 are an electric activation system and a method, the embodiments thereof comprise an actuator having a motor which generates a driving force for controlling a valve.

A valve assembly having a valve body and a valve element is known from US 2019/376610 A1, said valve element being configured such that it moves between an open position and a closed position.

A torque reducer for a high-pressure gate is known from U.S. Pat. No. 10,060,548B1, said torque reducer comprising a recirculating ball spindle assembly and a plunger gear assembly having a low torque, this permitting an individual user to activate a handwheel so as to open or close a gate under very high pressure without a reduction gear and a compensation spindle being required.

To date, it has been customary for the activation of the fittings to be performed hydraulically or pneumatically. However, the hydraulic components used to this end are comparatively expensive and moreover also demanding in terms of maintenance.

SUMMARY

The object of the invention now lies in achieving alternatives to the hydraulic activation of fittings of this type.

In order for this object to be achieved, it is first proposed that a ball screw drive is used for activating a self-closing, linearly activated fitting, said ball screw drive having the features of the independent claim directed toward the use of this type. In order for the object to be achieved, it is thus proposed in particular that a ball screw drive is used for activating a self-closing, linearly activated fitting, wherein a nut of the ball screw drive for opening the fitting is driven by an electric motor so as to thereby move in a translatory manner a spindle of the ball screw drive in the opening direction of the fitting and to open the fitting. For closing the fitting a linear restoring movement, for example a relaxing movement, is transmitted to the spindle. The transmission of the linear restoring movement to the spindle can result in the nut of the ball screw drive being driven by the spindle.

In the use of the ball screw drive it is thus provided that an electric-motor drive, for example a drive motor of an actuating drive which is connected to the ball screw drive, is used for opening the fitting. As has already been mentioned above, the fitting is self-closing. This can take place, for example, by an operating pressure of a conveyed medium acting on the fitting, said conveyed medium being oil or gas to be conveyed, for example, or else take place by a restoring movement and a restoring force of a restoring unit which is yet to be explained in more detail further below. In the case of a malfunction, thus in the event of a power blackout, when an electric-motor drive of the nut of the ball spindle drive can no longer be used for the necessary closing of the fitting, it is provided that the restoring movement, which can be transmitted to the spindle of the ball screw drive, is utilized for closing the fitting. In this context, it is advantageous for the ball screw drive not to be self-locking. In this way, a translatory restoring movement of the spindle counter to the opening direction of the fitting can be converted into a rotation of the nut of the ball screw drive and also into a rotation of a connected drive motor. This can have the effect that the restoring movement for closing the fitting is decelerated. Deceleration can take place above all when a closing movement of the fitting is performed at an excessive speed, the latter owing to a comparatively high restoring force. In this way, the ball screw drive, the fitting and an actuating drive which is potentially connected to the ball screw drive, including the components of said actuating drive, can be protected from damage.

The restoring movement mentioned above can be, for example, a relaxing movement which is imparted by a pressurized medium that is switched by the fitting. The medium switched by the fitting, for example oil or else gas, is typically pressurized. The pressure of the medium can be used for moving the fitting back to the closed position thereof. The restoring movement carried out by the fitting or by a closing element of the fitting in the process can be transmitted to the spindle, as has already been mentioned.

In another embodiment of the use, it is provided that the restoring movement is a relaxing movement of a restoring unit. The restoring unit here can comprise at least one restoring element, for example a spring. When opening the fitting, which can take place by way of the electric-motor drive of the nut and the translatory movement of the spindle in the opening direction, the restoring unit and the at least one restoring element thereof can be tensioned. In the case of a malfunction, thus when an electric-motor drive is no longer feasible or no longer desired, the drive energy, which is stored in the restoring unit as a result of the pre-tensioning of the restoring element, can be utilized solely for carrying out the restoring movement, in particular the relaxing movement, and for transferring said movement to the spindle in order for the fitting to be closed. As a result of the restoring movement the spindle, which can hold the fitting in the open position thereof, returns to an initial position assigned to the closed position such that the fitting, caused by a pressure of the pressurized medium and/or caused by the restoring force of the restoring unit, can be closed in a self-acting manner without utilizing an electric-motor drive.

In order to be able to protect from damage those components which are used when opening and closing the fitting, thus for example the ball screw drive, an actuating drive connected to the ball screw drive, and the components of said actuating drive, and ultimately also the fitting and the components thereof, it can be expedient for a restoring force that has been introduced into the spindle by the restoring movement, in the direction of force, to be at least partially dissipated behind the ball screw drive and/or by the ball screw drive. In this way, the restoring movement of the fitting to the closed position of the latter can be decelerated.

In this context, it is provided according to the invention that the dissipation of the previously mentioned restoring force takes place by a brake, specifically a centrifugal brake.

The latter can be, for example, a brake of an actuating drive connected to the ball screw drive.

In order for the associated components to be preserved, it can furthermore be advantageous for the spindle at the end of the restoring movement to be able to continue to run and to be able to be axially released from a connection to the fitting. In this way, it is possible for a motion pulse of the spindle, and optionally also of the components connected thereto, be dissipated. It can be avoided in this way that the spindle impacts a detent unbraked and in the process causes damage to the components connected to said spindle.

Proposed for achieving the object is also an actuating drive assembly of the type mentioned at the outset, which has the means and features of the independent claim directed toward an actuating drive assembly of this type. Proposed in order for the object to be achieved is thus an actuating drive assembly having an actuating drive, a ball screw drive which is driven by the actuating drive, and a linearly activated fitting, wherein the ball screw drive comprises a nut and a spindle which is at least indirectly connectable or connected to the fitting, wherein the fitting is able to be opened by means of an opening movement of the spindle, which is driven by way of the actuating drive and the nut, directed in the opening direction of the fitting, and is able to be closed by means of a restoring movement which in the closing direction of the fitting acts on the spindle and is caused by a restoring unit.

The ball screw drive here can be part of a linear drive system which is able to be retrofitted and/or removed in a modular manner and can be connected to an existing actuating drive. The actuating drive can be part of a fail-safe unit which in the use position is connected to the fitting and in the case of a malfunction facilitates self-acting closing of the fitting.

While the opening movement of the fitting in the actuating drive assembly takes place by an electric motor, i.e. the drive motor of the actuating drive, for closing the fitting a restoring movement, which is generated by the restoring unit, is transmitted to the spindle of the ball screw drive and by way of the nut of the ball screw drive optionally also back to a connected drive motor of the actuating drive. In the process, the spindle which for opening the fitting is moved in a translatory manner in the opening direction, returns in the opposite direction and makes space such that the fitting, in particular a closing element of the fitting, can be moved to the closed position, counter to the opening direction. As has already been explained above, the closing of the fitting can take place, for example, as a result of a pressure of the medium switched by the fitting, thus for example as a result of the pressure of the medium which is switched by the fitting. However, it is also possible to use the restoring unit for closing the fitting, the restoring movement of said restoring unit being transmitted to the spindle.

For this purpose, the restoring unit can have at least one restoring element, for example a restoring spring. The restoring movement can be a restoring movement and/or a relaxing movement of the at least one restoring element. When opening the fitting, which can take place by an electric motor by means of the drive motor of the actuating drive that is connected to the ball screw drive, as has already been mentioned in detail, the at least one restoring element of the restoring unit can be tensioned. In order for the fitting to be closed, the at least one restoring element of the restoring unit is relaxed such that the latter then performs a relaxing movement which can be used for resetting the spindle. In one embodiment of the actuating drive assembly it is provided that the restoring unit and the actuating drive are integrated in a fail-safe unit. In this way, the actuating drive and restoring unit as a fail-safe unit form a compact function unit of the actuating drive assembly that may optionally even be disposed in a common housing.

The actuating drive assembly, in particular the actuating drive, here can have terminal detents and/or terminal switches for the fitting. The terminal detents and/or terminal switches can define terminal positions of the fitting.

The actuating drive assembly, in particular the actuating drive, can have a rotary encoder for detecting terminal positions of the fitting. The rotary encoder here can be specified for ascertaining a rotating movement of the nut and/or for converting said rotating movement into a linear movement acting on terminal detents and/or on terminal switches.

In principle, it is also conceivable for the rotating movement to be detected on other components of the actuating drive assembly, for example in or on the actuating drive.

It is possible to at least indirectly detect terminal positions of the fitting by way of the rotary encoder. When commissioning the fitting, the latter can be moved between the open position and the closed position thereof so as to register the corresponding positions of the rotary encoder for the future monitoring of the position of the fitting. In this way it is possible to provide feedback to a control center by way of the rotary encoder in order for the position of the fitting to be centrally monitored.

Depending on the specific application, the restoring forces transmitted to the spindle by way of the restoring unit and/or the fitting can be comparatively high. Therefore, it can be advantageous for the nut of the ball screw drive on which the spindle is supported to be mounted by means of at least one axial bearing, which is specified for absorbing axial forces that are transmitted to the spindle by the restoring movement.

In one particularly advantageous embodiment of the actuating drive assembly it is provided that the spindle has a thread pitch of 16 mm. A thread pitch of 16 mm has proven to be an advantageous compromise between pitch-related friction between the spindle and the nut, and a driving force of a drive motor of the actuating drive that has to be applied by the electric motor in order for the fitting to be opened.

If the spindle has a thread pitch of less than 16 mm, frictional forces between the spindle and the nut can potentially be so high that automatic closing of the fitting is impeded, in particular in the case of a malfunction. In the case of a thread pitch of more than 16 mm, for example 20 mm, a comparatively high motor force may be required in order to adjust the spindle counter to the effect of the restoring unit and/or counter to a pressure potentially bearing on the fitting and to open the fitting.

In order to be able to dissipate a restoring force transmitted to the spindle, it is provided according to the invention that the actuating drive assembly, in particular the actuating drive, has a brake unit having at least one brake. The brake unit has according to the invention a centrifugal brake, but may also comprise an operating current brake. The use of a centrifugal brake is advantageous when the restoring movement that is transmitted to the spindle is comparatively rapid. The higher the speed at which the spindle is moved back, the higher a rotating speed of a drive shaft of the drive motor of the actuating drive can be, said rotating speed acting on the centrifugal brake, so that a correspondingly high braking force is applied by the centrifugal brake in this instance. This results in a self-regulating braking behavior which can be available across a large speed range.

In one embodiment of the actuating drive assembly, a gearbox, for example a planetary gear and/or a worm gear, are/is disposed between a drive motor of the actuating drive and the ball screw drive. The gearbox is preferably not self-locking so as not to prevent the previously mentioned restoring movement that is transmitted to the spindle.

A releasable interface is configured according to the invention between the ball screw drive, in particular the spindle, and the restoring unit, said releasable interface being able to be opened when closing and/or opening the fitting. The release of the interface can be performed, for example, by tensile forces acting in the closing direction and/or in the opening direction. Furthermore, the interface can be specified for transmitting compressive forces in the closing direction and in the opening direction. When opening the fitting, it is possible in this way to apply compressive forces at least indirectly, by way of the spindle, to the fitting so as to move the latter to the open position and/or to hold the latter therein. A compressive force can again be transmitted by way of the previously mentioned interface during the restoring movement, said compressive force in this instance however being aligned in the closing direction and leading to the spindle being able to be moved back without an electric-motor drive. The release of the interface enables the spindle to overrun and may protect the spindle, the nut, the actuating drive and the fitting, and the respective components thereof, from damage.

In one embodiment of the actuating drive assembly it is provided that the actuating drive assembly, in particular the previously mentioned interface, is specified for rotationally fixing the spindle. It is prevented in this way that the spindle, when interacting with the nut, rotates under the effect of the restoring movement of the restoring unit. The interface can have a guide element, for example a feather key or a spline shaft connection, which couples a drive output of the restoring unit to the spindle.

The guide element here can have axial play which is of such a dimension that a rotational fixing of the spindle is maintained when opening and closing the fitting. The rotational fixing can be maintained when opening and closing the fitting even when the interface is released while opening and/or closing the fitting, as has been previously mentioned.

In one embodiment of the actuating drive assembly, for rotationally fixing the spindle a bush which is rotationally fixed in a housing part of the actuating drive assembly is provided. The bush can prevent relative rotation between the spindle and the bush and/or between the spindle and the housing part. The bush can be mounted so as to be axially displaceable in the housing part and/or axially fixed on the spindle. In this way, reliable rotational fixing of the spindle, at least across a relevant part of the axial adjustment range of the spindle, preferably across the entire axial adjustment range of the spindle, can be provided with the aid of the bush. It can also be provided that the bush is disposed so as to be axially displaceable on the spindle. The bush in this instance can be disposed, for example, so as to be axially displaceable or axially fixed in the housing part.

An axial stroke of the fitting between the open position thereof and the closed position thereof, and/or an axial stroke of the spindle, can be of such a dimension that balls of the ball screw drive cannot perform a complete recirculation in the ball screw drive. In this way, a large number of balls that are able to be simultaneously stressed can be kept available in the ball screw drive while maintaining a short stroke length. This is particularly favorable in the event of the loading, provided according to the invention by the fitting and/or the restoring unit, of the spindle of the ball screw drive in the reverse drive.

BRIEF DESCRIPTION OF THE DRAWINGS

The invention will be described in more detail hereunder by means of exemplary embodiments, but is not limited to these exemplary embodiments. Further exemplary embodiments are derived by combining the features of individual or several claims with one another, and/or when combining individual or several features of the exemplary embodiment. In the figures, in some instances in a highly schematic illustration:

DETAILED DESCRIPTION

Figure 1:
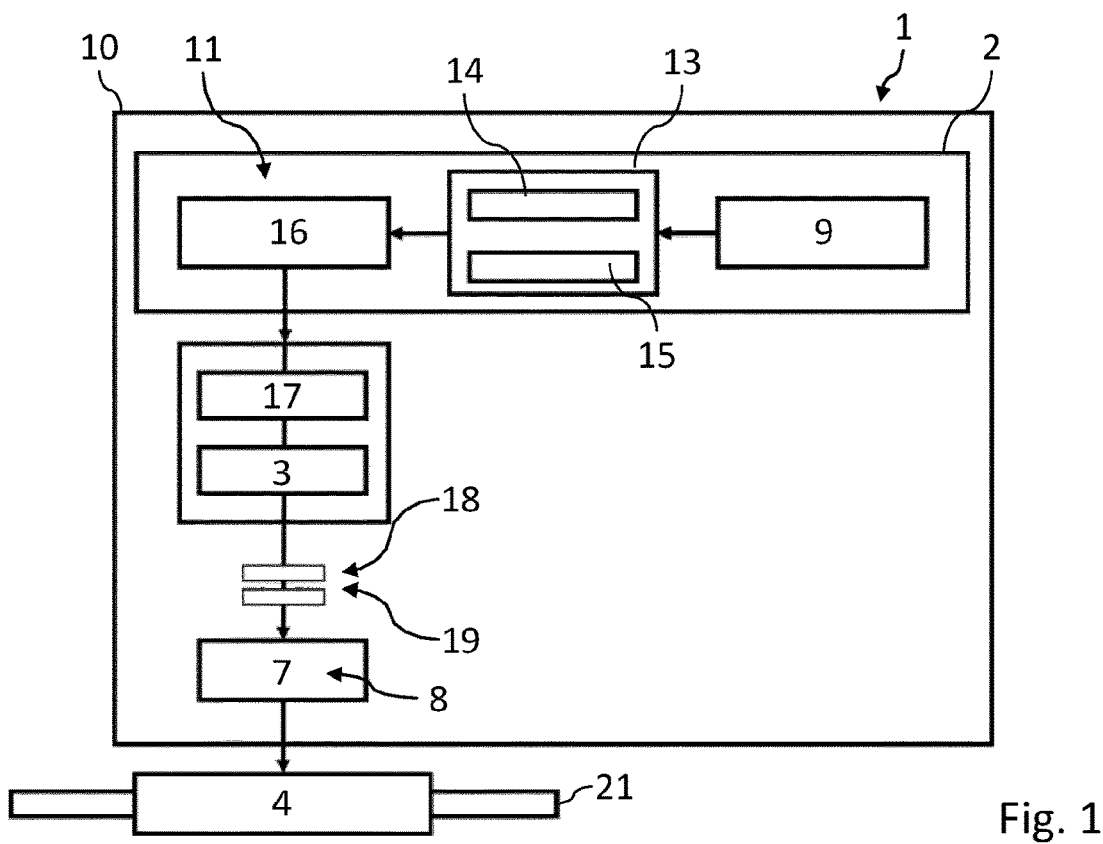
FIG. 1: shows a block diagram for visualizing a first embodiment of an actuating drive assembly having an actuating drive, a linear drive system having a ball screw drive, having a restoring unit and having a fitting, wherein the restoring unit and the actuating drive are integrated in a fail-safe unit.

In the description hereunder of different embodiments of the invention, functionally equivalent elements have the same reference signs, even if said elements differ in design or shape.

The figures show at least parts of actuating drive assemblies which in their entirety are in each case identified by the reference sign 1.

Each of the actuating drive assemblies 1 shown comprises an actuating drive 2, a ball screw drive 3 driven by the actuating drive 2, and a linearly activated fitting 4.

The ball screw drive 3 comprises a nut 5 and a spindle 6 which is at least indirectly connected to the fitting 4.

The fitting 4 is able to be opened by means of an opening movement of the spindle 6 which is driven by way of the actuating drive 3 and the nut 5, said opening movement being directed in the opening direction of the fitting 4. The fitting 4 can be closed again by means of a restoring movement caused by a restoring unit 7 and acting on the spindle 6, said restoring movement acting in the closing direction of the fitting 4. The restoring unit 7 comprises at least one restoring element 8, for example a restoring spring. The restoring movement that acts on the spindle 6 when closing the fitting 4 here is a restoring movement and/or a relaxing movement of the restoring element 8 of the restoring unit 7.

The ball screw drive 3 is able to be driven by a drive motor 9 of the actuating drive 2. In the actuating drive assembly 1 shown in FIG. 1, the restoring unit 7 and the actuating drive 2 are integrated in a fail-safe unit 10. In the exemplary embodiment of an actuating drive assembly 1 shown in FIG. 2, a separate restoring unit 7 is used.

The actuating drive assembly 1, here the respective actuating drive 2, comprises terminal switches for the fitting 4. The terminal switches can define terminal positions of the fitting 4.

The actuating drives 2 of the actuating drive assemblies 1 shown in the figures have in each case a rotary encoder 11. The rotary encoders 11 are specified for detecting terminal positions of the respective fitting 4. With the aid of the rotary encoders 11 it is possible for a rotating movement of the respective nut 5 to be ascertained in the process and to mathematically convert said rotating movement to a linear movement acting on terminal detents.

Figure 3:
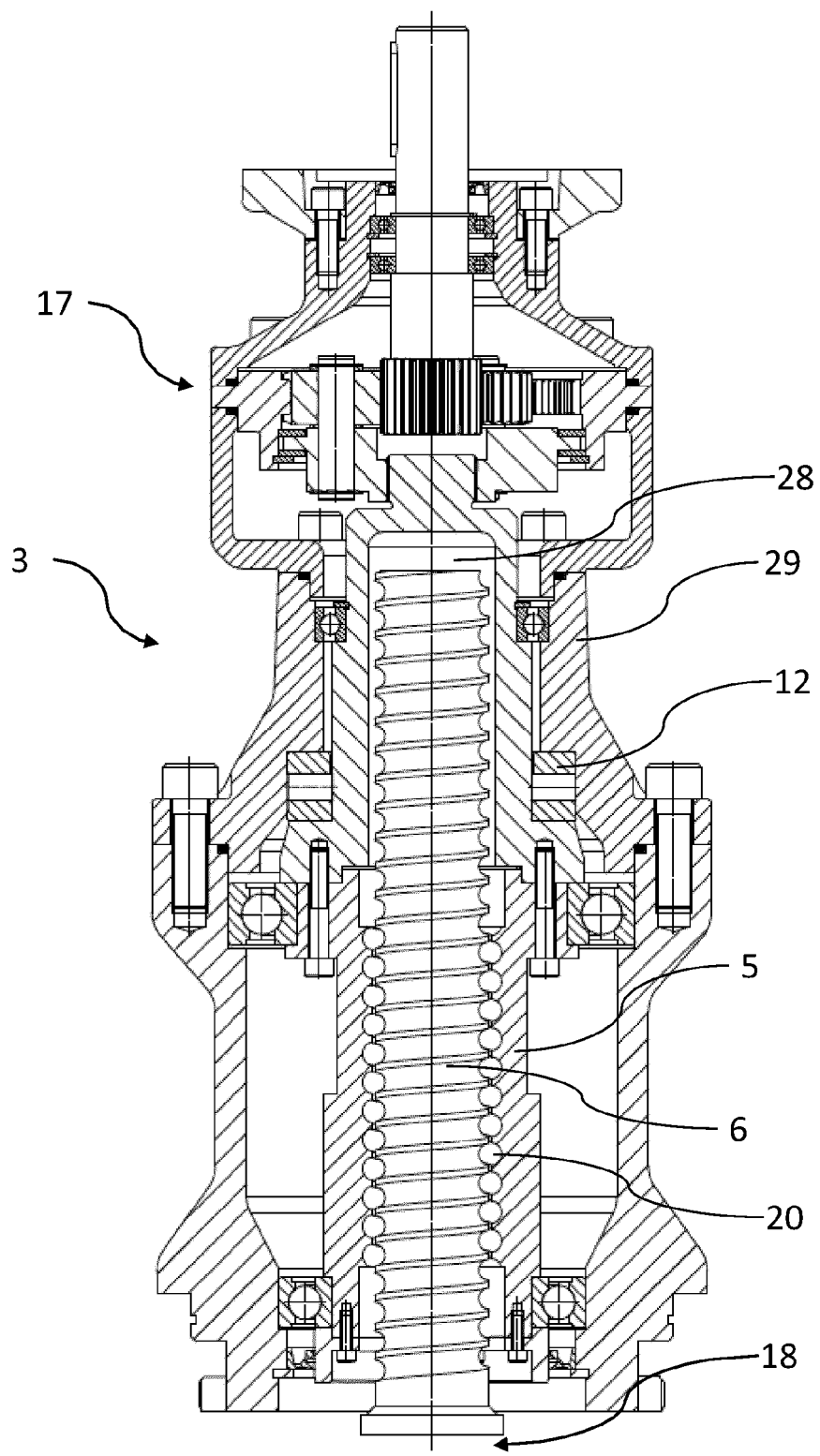
FIG. 3: shows a sectional illustration of a ball screw drive of an actuating drive assembly according to the invention.

FIG. 3 highlights that the nut 5 of the ball screw drive 3 shown there is also mounted by means of an axial bearing 12. The axial bearing 12 is disposed such that said axial bearing 12 is specified for absorbing axial forces that are transmitted to the spindle 6 by way of the restoring movement. In this way it is possible for comparatively high restoring forces to be transmitted from the spindle 6 to the nut 5.

Figure 4:
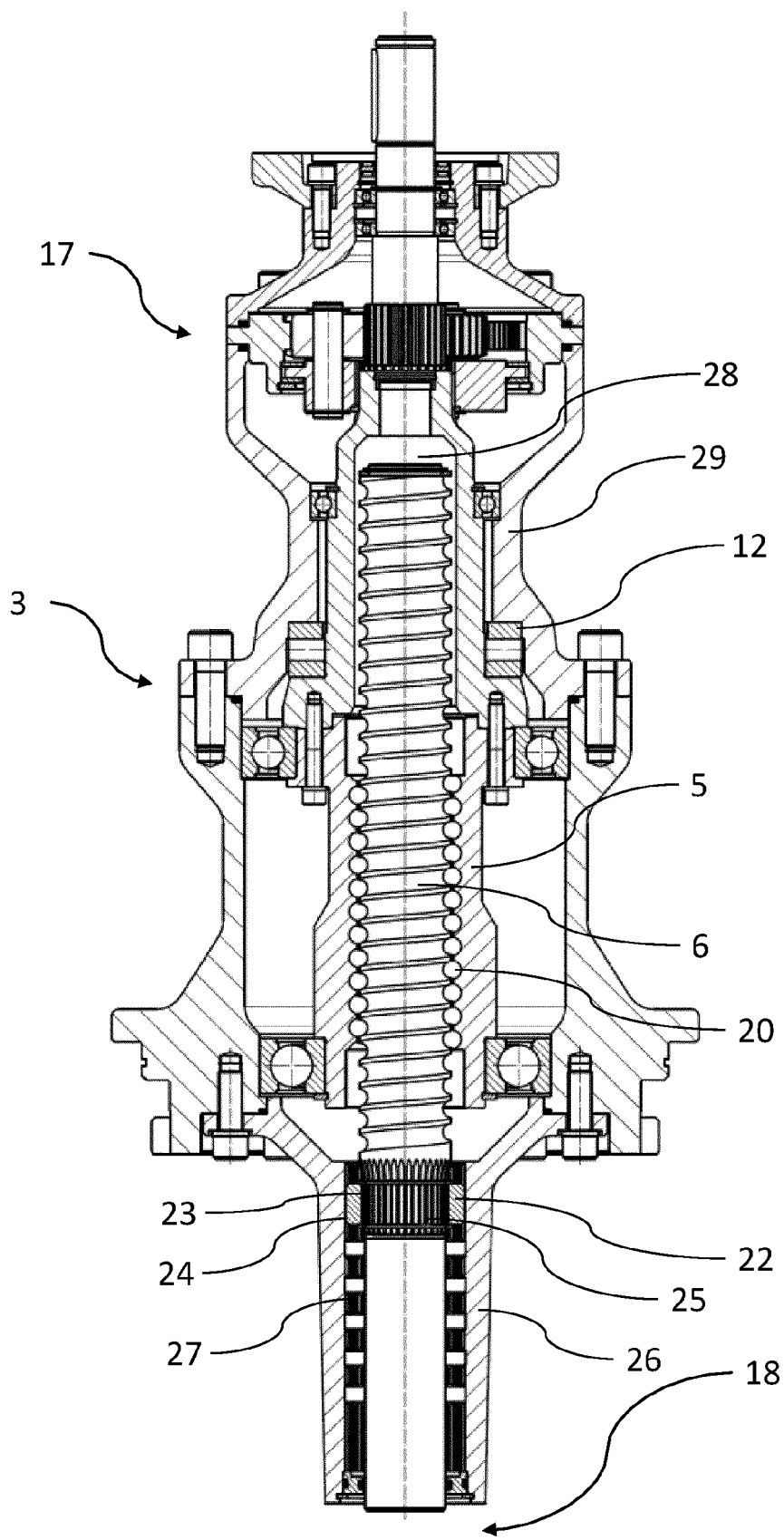
FIG. 4: shows a sectional illustration of a further embodiment of a ball screw drive of an actuating drive assembly according to the invention, wherein a spindle of the ball screw drive herein is rotationally secured by means of an internal toothing of a bush, the spindle running through the latter.

The spindles 6 illustrated in FIGS. 3 and 4 have a thread pitch of 16 mm.

Figure 2:
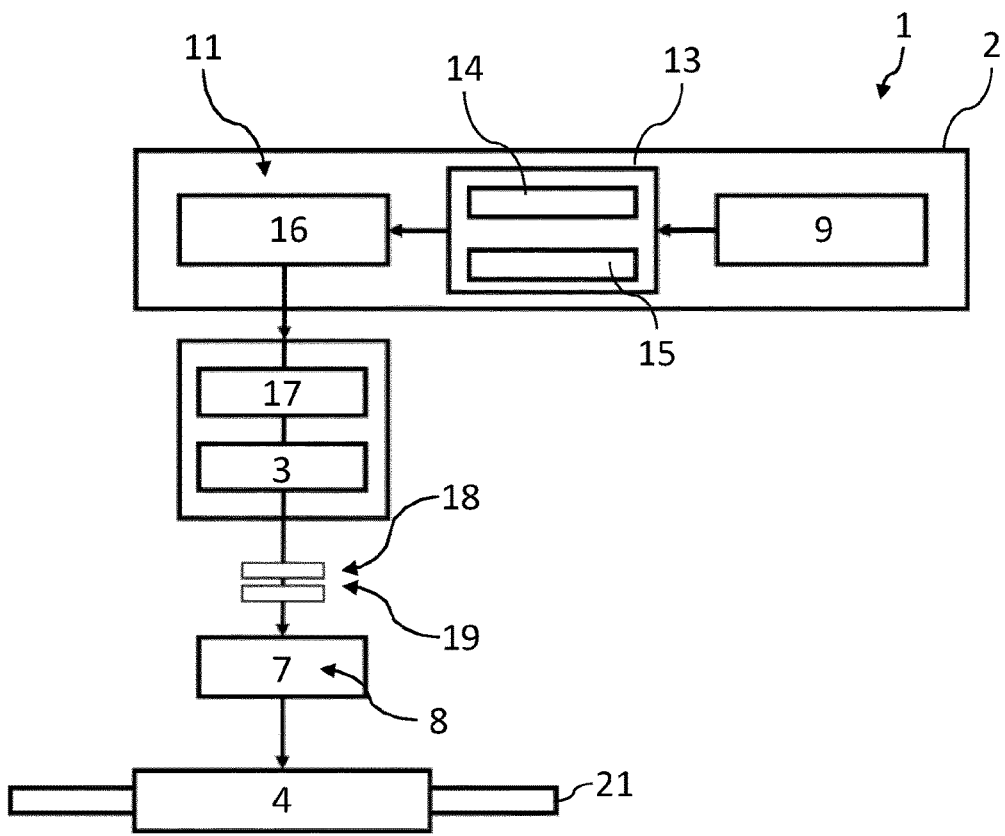
FIG. 2: shows a block diagram for visualizing a further embodiment of an actuating drive assembly having an actuating drive, a linear drive system having a ball screw drive, having a restoring unit and having a fitting, wherein the restoring unit is configured as a separate module between the actuating drive and the fitting.

According to the two block diagrams of FIGS. 1 and 2, each of the actuating drives 2 shown comprises a brake unit 13. The brake units 13 comprise in each case an operating current brake 14 and a centrifugal brake 15.

Two gearboxes, specifically a worm gear 16 and a planetary gear 17, are provided between the drive motor 9 of the actuating drive 2 and the ball screw drive 3. The worm gear 16 as well as the planetary gear 17 are in each case not configured so as to be self-locking. The rotation of a drive output shaft of the drive motor 9 of the actuating drive 2 can be deflected by 90° with the aid of the worm gear 16. A reduction of the rotating speed introduced by way of the worm gear 16 into the planetary gear 17 is possible with the aid of the planetary gear 17. The rotating speed which for driving the spindle 6 is transmitted from the planetary gear 17 to the nut 5 of the ball screw drive 3 is thus lower than the rotating speed by way of which the drive output shaft of the drive motor 9 of the actuating drive 2 rotates. However, by means of the reduction provided by the planetary gear 17, in this instance a higher torque bears on the nut 5 such that not only can the fitting 3 be moved from the closed position thereof to the open position thereof but the restoring force of the restoring unit 7 can also be overcome by activating the spindle 6.

FIGS. 1 and 2 highlight that a releasable interface 18 is configured between the ball screw drive 3, specifically between the spindle 6 of the ball screw drive 3, and the restoring unit 7. The releasable interface 18 can be opened when closing the fitting. The is performed by tensile forces that act on the interface 18, acting in each case in the closing direction and also in the opening direction. The releasable interface 18 between the spindle 6 and the restoring unit 7 can open in particular when the fitting 4 is closed and the spindle 6, by virtue of the mass inertia thereof and/or of the mass inertia of the drive motor 9, potentially overruns somewhat.

In order for the fitting 4 to be moved to the open position thereof with the aid of the spindle 6, and for the spindle 6 with the aid of the restoring unit 7 to be impinged with the aid of the restoring unit 7 during the self-acting closing of the fitting 4, and for the restoring movement of the restoring unit 7 to be transmitted to the spindle 6, the interface 18 is specified for transmitting compressive forces in the closing direction and in the opening direction.

In order to prevent that the spindle 6 under axial loading rotates relative to the nut 5 driving the spindle, the interface 18 is moreover also specified for rotationally fixing the spindle 6. For this purpose, the interface 18 has a guide element 19 which can be configured as a feather key, for example. The interface 18, with the aid of the guide element 19, is specified for coupling a drive output of the restoring unit 7 to the spindle 6. The guide element 19 here permits axial play which is of such a dimension that the rotational fixing of the spindle 6 is maintained when opening and closing the fitting 4. The rotational fixing of the spindle 6 is thus not canceled during the orderly operation of the fitting 4.

FIG. 4 shows an exemplary embodiment of an actuating drive assembly 1 in which a bush 22 is provided for rotationally fixing the spindle 6. The bush 22 is specified and provided for preventing relative rotation between the spindle 6 and the bush 22 and between the spindle 6 and the housing part 26. The bush 22 here is mounted so as to be axially displaceable in the housing part 26 and is simultaneously axially fixed to the spindle 6.

The bush 22 has an internal toothing 23 and an external toothing 24. The internal toothing 23 of the bush 22 engages with a corresponding external toothing 25 of the spindle 6. The corresponding toothings 23 and 25 reliably prevent the spindle 6 from rotating relative to the bush 22. The bush 22 is axially established on the spindle 6 and moves conjointly with the spindle 6 when the spindle 6 moves in and out within the housing part 26, the latter surrounding the spindle 6 and the bush 22.

An internal toothing 27 which is configured so as to correspond to the external toothing 24 of the bush 22 and engages with the external toothing 24 is configured in the housing part 26. The external toothing 24 of the bush 22 and the internal toothing 27 of the housing part 26 prevent the bush 22 from rotating within the housing part 26 but do permit an axial displacement of the bush 22 within the housing part 26.

The corresponding toothings 23 and 25 as well as 24 and 27 can also withstand comparatively high forces and provide a high rotational resistance across the entire axial adjustment range of the spindle 6.

According to FIGS. 3 and 4, a receptacle space 28 into which the spindle 6 can overrun without colliding with components of the actuating drive assembly 1 is in each case provided in the housing 29. Additionally or alternatively to the receptacle space 28, a damping element could also be used for damping an axial overrunning movement of the spindle 6 and for avoiding a collision between the spindle 6 and components of the actuating drive assembly 1.

An axial stroke of the fitting 4 between the open position thereof and the closed position thereof, and an axial stroke of the spindle 6 that is traveled by the spindle 6 in order to move the fitting 4 between the open position of the latter and the closing position of the latter, are of such a dimension that balls 20 of the ball screw drive 3 cannot perform a complete recirculation in the ball screw drive 3.

In the actuating drive assemblies 1 which are at least partially shown in FIGS. 1 to 3, the ball screw drives 3 are thus used for activating a self-closing, linearly activated fitting 4. It is provided here that a nut 5 of the ball screw drive 3 for opening the fitting 4 is driven by an electric motor, as a result thereof a spindle 6 of the ball screw drive 3 is moved in a translatory manner in the opening direction of the fitting 4, and the fitting 4 is opened as a result. For closing the fitting 4, a linear restoring movement, here a relaxing movement, is transmitted to the spindle 6. The restoring movement can be a relaxing movement which is imparted by a pressurized medium which is switched by the fitting 4. The restoring movement can also be a relaxing movement of the restoring unit 7, already mentioned above, of the previously described actuating drive assembly 1. To this end, the restoring unit 7 has at least one restoring element 8, as has likewise already been explained above.

A restoring force that has been introduced into the spindle 6 by the restoring movement can be at least partially dissipated behind the ball screw drive 3 and in part also by the ball screw drive 3. In the actuating drive assemblies 1 illustrated in FIGS. 1 and 2, the dissipation of the restoring force is performed by the brakes 14 and 15 of the brake units 13 of the actuating drive assemblies 1 illustrated.

At the end of the restoring movement the spindle 6 may overrun and be released from the fitting 4. In the exemplary embodiments of the actuating drive assemblies 1 shown in the figures, the release of the spindle 6 is performed at the interface 18, between the spindle 6 and the restoring unit 7.

FIGS. 1 and 2 show that the fitting is connected to a line 21, for example a pipeline. A medium, which is potentially pressurized and can be switched by the fitting 4, flows through the line 21. A flow through the line 21 is disabled in the closed position of the fitting 4. The line 21 is passable when the fitting 4 is opened by way of the ball screw drive 3.

According to FIG. 4, a distal end of the spindle 6 is surrounded by a wiper ring 25 which prevents ingress of dirt as a result of the movement of the spindle 6.

The invention is directed toward improvements in the technical field of actuating drives 2. Proposed to this end is, inter alia, the use of a ball screw drive 3 for activating a self-closing, linearly activated fitting 4. While the opening of the fitting 4 by means of an actuating drive 2 takes place by an electric motor by way of the ball screw drive 3, a restoring movement is transmitted to the spindle 6 and from the latter to the nut 5 of the ball screw drive 3 when closing the automatically closing fitting 4. The restoring movement, and thus also a closing movement of the fitting 4, can be decelerated by way of the ball screw drive 3, in particular by means of the centrifugal brake 15, this being able to protect the fitting 4 and ultimately also the ball screw drive 3 and moreover optionally further components of an actuating drive assembly 1 from damage, and moreover also being able to facilitate a fail-safe function.

LIST OF REFERENCE SIGNS

1 Actuating drive assembly
2 Actuating drive
3 Ball screw drive
4 Fitting
5 Nut
6 Spindle
7 Restoring unit
8 Restoring element
9 Drive motor
10 Fail-safe unit
11 Rotary encoder
12 Axial bearing
13 Brake unit
14 Operating current brake
15 Centrifugal brake
16 Worm gear
17 Planetary gear
18 Interface between 6 and 7
19 Guide element
20 Ball
21 Line
22 Bush
23 Internal toothing of 22
24 External toothing of 22
25 External toothing of 6
26 Housing part
27 Internal toothing in 6
28 Receptacle space
29 Housing

The invention claimed is:

1. A method for activating a self-closing, linearly activated fitting (4) using a ball screw drive (3), the method comprising:

providing an actuating drive (2) for driving the ball screw drive (3) the ball screw drive (3) comprises a nut (5) and a spindle (6) which is at least indirectly connectable or connected to the fitting (4), the actuating drive further including a restoring unit (7) configured to provide a linear restoring movement which acts on the spindle (6) in a closing direction of the fitting (4), a brake unit (13) including a centrifugal brake (15), and a releasable interface (18) that is openable during at least one of closing or opening the fitting (4) and is configured between the ball screw drive (3) and the restoring unit (7);

driving the nut (5) of the ball screw drive (3) for opening the fitting (4) via an electric motor to translationally move the spindle (6) of the ball screw drive (4) in an opening direction of the fitting (4) to open the fitting (4);

for closing the fitting (4), transmitting the linear restoring movement from the restoring unit (7) to the spindle (6);

at the end of the restoring movement, continuing to run the spindle (6) and axially releasing the spindle (6) from a connection to the fitting (4); and at least partially dissipating a restoring force that has been introduced into the spindle (6) by the restoring movement, in a direction of force, behind the ball screw drive (3) by the actuating drive (2) connected to the ball screw drive (3).

2. The method as claimed in claim 1, wherein the restoring movement is at least one of a relaxing movement which is imparted by a pressurized medium that is switched by the fitting (4), or the relaxing movement of the restoring unit (7) having at least one restoring element (8).

3. The use as claimed in claim 1, wherein the restoring force that has been introduced into the spindle (6) by the restoring movement, in the direction of force, is at least partially dissipated by the ball screw drive (3) by the brake unit (14, 15) of the actuating drive (2) connected to the ball screw drive (2).

4. An actuating drive assembly (1), comprising:
an actuating drive (2);
a linearly activated fitting (4);
a ball screw drive (3) which is driven by the actuating drive (2) the ball screw drive (3) comprising a nut (5) and a spindle (6) which is at least indirectly connectable or connected to the fitting (4), wherein the fitting (4) is openable by a translational opening movement of the spindle (6), which is driven by the actuating drive (2) and the nut (5), directed in an opening direction of the fitting (4);
a restoring unit (7) configured to provide a linear restoring movement which acts on the spindle (6) in a closing direction of the fitting (4), wherein the fitting (4) is closable by transmitting the linear restoring movement from the restoring unit (7) to the spindle (6), wherein the spindle (6) is configured to be axially released from a connection to the fitting (4) at the end of the restoring movement and to continue to run at the end of the restoring movement;

a brake unit (13) including a centrifugal brake (15), wherein the brake unit (13) is configured to be able to at least partially dissipate a restoring force that has been introduced into the spindle (6) by the restoring movement, in a direction of force, behind the ball screw drive (3); and a releasable interface (18) is openable during at least one of closing or opening the fitting (4) is configured between the ball screw drive (3) and the restoring unit (7).

5. The actuating drive assembly (1) as claimed in claim 4, wherein the restoring unit (7) has at least one restoring element (8), and the restoring movement is a restoring movement or relaxing movement of the at least one restoring element (8).

6. The actuating drive assembly (1) as claimed in claim 4, wherein at least one of a) the restoring unit (8) and the actuating drive (2) are integrated in a fail-safe unit (10), or b) the actuating drive assembly (1) has at least one of terminal detents or terminal switches for the fitting (4).

7. The actuating drive assembly (1) as claimed in claim 4, further comprising, a rotary encoder (11) for detecting terminal positions of the fitting (4), the rotary encoder (11) is configured for at least indirectly ascertaining a rotating movement of the nut (5) and for converting said rotating movement into a linear movement acting on at least one of terminal detents or terminal switches.

8. The actuating drive assembly (1) as claimed in claim 4, wherein the nut (5) of the ball screw drive (3) is mounted by at least one axial bearing (12) that is configured to absorb axial forces that are transmitted to the spindle (6) by the restoring movement.

9. The actuating drive assembly (1) as claimed in claim 4, wherein the spindle has a thread pitch of 16 millimeters.

10. The actuating drive assembly (1) as claimed in claim 4, wherein the brake unit (13) comprises an operating current brake (14).

11. The actuating drive assembly (1) as claimed in claim 4, further comprising a gearbox disposed between a drive motor (9) of the actuating drive (2) and the ball screw drive (4).

12. The actuating drive assembly (1) as claimed in claim 4, wherein the releasable interface (18) is configured between the ball screw drive (3) and the restoring unit (7), said releasable interface (18) being able to be opened when closing and/or opening the fitting (4), by tensile forces acting in at least one of the closing direction or the opening.

13. The actuating drive assembly (1) as claimed in claim 12, wherein the releasable interface (18) is configured for rotationally fixing the spindle (6), and the releasable interface (18) has a guide element (19) which couples a drive output of the restoring element (7) to the spindle (6).

14. The actuating drive assembly (1) as claimed in claim 13, wherein the guide element (19) has axial play which is dimensioned so that the rotational fixing is maintained when opening and closing the fitting (4).

15. The actuating drive assembly (1) as claimed in claim 4, further comprising a bush (22) which is rotationally fixed in a housing part (26) and prevents relative rotation between at least one of the spindle (6) and the bush (22) or between the spindle (6) and the housing part (26).

16. The actuating drive assembly (1) as claimed in claim 15, wherein the bush (22) is mounted so as to be at least one of axially displaceable in the housing part (26) or axially fixed to the spindle (6).

17. The actuating drive assembly (1) as claimed in claim 4, wherein an axial stroke of the fitting (4) between the open position thereof and the closed position thereof is dimensioned such that balls (20) of the ball screw drive (3) cannot perform a complete recirculation in the ball screw drive (3).

18. The actuating drive assembly (1) as claimed in claim 4, wherein said releasable interface (18) is configured for transmitting compressive forces in the closing direction and in the opening direction.

* * * * *